United States Patent [19]

Smiley

[11] 4,113,913

[45] Sep. 12, 1978

[54] FOAMED CEMENTITIOUS MATERIAL AND COMPOSITE

[75] Inventor: Leonard H. Smiley, Jenkintown, Pa.

[73] Assignee: Rohm and Haas Company, Philadelphia, Pa.

[21] Appl. No.: 686,193

[22] Filed: May 13, 1976

[51] Int. Cl.$^2$ .................................. C04B 15/02
[52] U.S. Cl. .................................. 428/310; 106/86; 106/87; 106/88
[58] Field of Search .................. 106/86, 87, 88; 428/304, 310, 317; 260/29.65

[56] References Cited

U.S. PATENT DOCUMENTS

| | | | |
|---|---|---|---|
| 1,983,021 | 12/1934 | Eaton | 106/88 |
| 2,946,158 | 7/1960 | Seipt | 106/87 |
| 3,147,177 | 9/1964 | Owens et al. | 428/310 |
| 3,870,553 | 3/1975 | Hussey | 260/29.65 |
| 3,979,217 | 9/1976 | Sutton | 106/88 |

Primary Examiner—J. Poer
Attorney, Agent, or Firm—Lester E. Johnson; Michael B. Fein

[57] ABSTRACT

A foamed cementitious material comprising portland cement and a film-forming, water-resistant, alkali-stable emulsion polymer and process of preparing said foamed material is described. Also described are laminated cementitious composites of an unfoamed veneer of a mixture of portland cement and a film-forming, water-resistant, alkali-stable emulsion polymer applied at the surface of a layer of the above-described foamed cementitious material, and, optionally, a layer of plywood or metal further applied at the exposed foamed material surface are described. These materials are useful as exterior building covering articles.

4 Claims, No Drawings

FOAMED CEMENTITIOUS MATERIAL AND COMPOSITE

BACKGROUND OF THE INVENTION

This invention relates to foamed cementitious materials, especially useful as exterior building covering articles such as roofing or siding. There is a recognized need in the building industry for materials which exhibit good fire resistance, have good insulative properties, and which possess good weatherability and durability. If these materials possessed other advantages such as lightness of weight, ease of application, improved ductility, and attractive surface qualities, they would have distinct advantages when compared with existing building materials.

The art of making foamed concrete compositions and structures containing cement, certain polymers, and certain filler materials is known. The polymers of the prior art compositions, however, are not film-forming, and water-resistant, and alkali-stable. Such compositions have provided some improvement in the art in that the mechanical strength and lightness of weight of such concrete structures has been improved. These materials of the prior art achieve one or more but not all of such objectives as lightness of weight, good fire resistance, good water resistance, good insulative properties, improved weatherability and durability, and ease of handling during manufacture and installation.

In summary, this invention is a foamed cementitious material comprising a foamed base mixture of portland cement and a film-forming, and water-resistant, alkali-stable emulsion polymer. This material may further include one or more components selected from the group consisting of sand, pigment, and reinforcement filler. In another aspect, this invention is a laminated cementitious composite comprising (A) a thin unfoamed veneer of a mixture of portland cement and a film-forming, and water-resistant, and alkali-stable emulsion polymer applied at the surface of (B) the above-described foamed cementitious material. Either, or both, the veneer and foamed layer may further include one or more components selected from the group consisting of sand, pigment, and reinforcement filler. The foamed cementitious material and laminated cementitious composite may still further be applied, at the surface of said foamed material, to a sheet backing.

The cement used in this invention may be any one of the portland cements. Preferably, Type I or Type III portland cement is used. More preferably, the cement should also be white in color to allow for optimum brightness when the cementitious material is pigmented. Also, the cement should most preferably have low calcium ion concentration so as to prevent efflorescence on exterior exposure.

The emulsion polymer used in this invention is selected from the group consisting of film-forming, and water-resistant and alkali-stable aqueous emulsion polymers which, when mixed as aqueous emulsions with cement, permits the cement to adequately hydrate at ambient conditions. Preferred aqueous emulsion polymers ae acrylic copolymers, styrene/butadiene copolymers, vinylidene chloride polymers and vinyl chloride/vinylidene chloride copolymers. More preferred polymer systems are those of the acrylic copolymers and styrene/butadiene copolymers. Most preferred is the acrylic copolymer system.

The acrylic emulsion copolymer system employed in this invention comprises a polymerized monomer system of $C_{1-18}$ alkyl acrylate parts, $C_{1-6}$ alkyl methacrylate, and polymerized ethylenically unsaturated carboxylic acid, said acid constituting 0.5 to 2.5% of said copolymer and the ratio of said acrylate to methacrylate being from 4:6 to 9:1.

Typical alkyl acrylate monomers are methyl acrylate, ethyl acrylate, propyl acrylate, butyl acrylate, 2-ethylhexyl acrylate, octyl acrylate, dodecyl acrylate, octadecyl acrylate and the like. Typical methacrylate monomers are methyl methacrylate, ethyl methacrylate, t-butyl methacrylate, t-amyl methacrylate, cyclohexyl methacrylate, and the like. Preferred polymerizable ethylenically unsaturated carboxylic acids are methacrylic acid and then acrylic acids.

The styrene/butadiene emulsion copolymer employed in this invention comprises an aqueous polymerized monomer system of styrene and butadiene in a ratio of parts by weight of about 1:1.

The use of these emulsion polymers achieves objectives and advantages in addition to permitting adequate hydration at ambient conditions. The use of the film-forming, and water-resistant, and alkali-stable emulsion polymers provides unexpectedly advantageous ductility and weatherability to the cementitious material and composite such that spalling, cracking, fading, and efflorescence is reduced and minimized. Also, the polymer serves as an adhesive agent in making the composites of this invention.

The foamed cementitious material may further include 0.025 to 2.4 parts by weight sand per part by weight cement. Preferably, the sand should have low calcium ion concentration so as to prevent efflorscence on exterior exposure.

Also, the foamed cementitious material may further include 0.001 to 0.4 parts by weight pigment per part by weight cement. The pigment used in this invention can be any that is stable in the cementitious mixture. For exterior use, the pigment should not be subject to color change due to weathering. Iron oxides, titanium dioxide, and carbon blacks are typical of such pigments.

Both the foamed and unfoamed cementitous materials may be reinforced by the addition of 0.001 to 0.8 parts fibrous filler material per part cement. Preferably glass fibers as chopped, milled, or continuous mat is used as fibrous filler material. Other fibers, such as those of jute, sisal, carbon, and crosslinked polyvinyl alcohol, may also be used. The fiber length should be ⅛ inch to 3 inches; preferably the fiber length should be about ⅛ inch to ½ inch. More preferably, the fiber length should be about ¼ inch.

Generally, the foamed cementitious material of this invention has a base mixture comprising 0.001 to 2 parts by weight film-forming, and water-resistant, and alkali-stable emulsion polymer per part by weight portland cement. This base mixture may contain up to 1% surfactant added so as to facilitate foaming. To this base mixture may also be added one or more components selected from the group consisting of 0.025 to 2.4 parts by weight sand per part by weight cement; 0.001 to 0.4 parts by weight pigment per part by cement; and 0.001 to 0.8 parts fibrous reinforcement filler per part cement. When the foamed material is made by a method wherein a gas is chemically generated in situ in the cement-emulsion polymer slurry, further components of the foamed cementitious material is the product from the reaction of the gas evolving agent, which is preferably about 1% Al powder, with the aqueous medium which is maintained at an alkaline pH by further addition of about 1% alkaline metal hydroxide base (20% aqueous solution) such as, for example, NaOH or KOH, so as to accelerate the rise.

The foamed cementitious material of this invention can be prepared by a process comprising the steps of:
(a) providing a base mixture of cement and emulsion polymer;
(b) mechanically frothing said base mixture by high speed mechanical agitation means;
(c) casting said foam into a mold having a suitable surface;
(d) allowing said casted foam to harden; and
(e) removing said foamed cementitious material from the mold and curing.

Optionally, at least about 0.1% each, based on total amount of cement and polymer of alkaline metal hydroxide and powdered aluminum can be included in the base mixture so as to cause foaming by the reaction of the powdered aluminum and water thereby obviating the need for mechanical frothing.

Preferably, the unfoamed cementitious material of this invention comprises portland cement, and on a weight basis per part of said cement: 0.001 to 2 parts by weight film-forming, and water-resistant, and alkali-stable emulsion polymer; 0.001 to 0.4 parts pigment; 0.025 to 2.4 parts sand; and 0.025 to 2 parts water. This material may further include 0.001 to 0.8 parts fibrous reinforcement.

The laminated cementitious composite of this invention comprises a veneer of the unfoamed cementitious material on a substrate of the foamed cementitious material. The foamed material is applied at the surface of and fixed to, at its interface with, said unfoamed material.

The laminated cementitious composite of this invention is made by a process comprising the steps of:
(a) casting an unfoamed cementitious veneer comprising portland cement and film-forming, and water-resistant, and alkali-stable emulsion polymer into a mold having a suitable surface;
(b) casting the foamed cementitious base mixture described hereinabove onto the veneer;
(c) allowing the composite material to harden whereupon the unfoamed and foamed materials become fixed at their interface; and
(d) removing the resultant composite from the mold and curing.

The cementitious material or composite of this invention may further be fixed to a sheet backing such as, for example, a plywood and metal sheet by applying said sheet at the exposed foamed cementitious material surface of the casted cementitious composite prior to allowing said composite to harden and to cure.

The surface which serves as a casting mold may be of silicone rubber, cardboard, and plastics which do not adhere to cement such as, for example, polyvinyl chloride and polyester sheet.

The mold surface may be shaped and designed as desired so as to translate said shape, dimensions and design to the surface of the cementitious and composite material. The choice of the shape, dimensions and design of the mold are limitless and are selected according to the desired application of the cementitious material and composite. A particularly useful application of the cementitious material and composite within the scope of this invention is that as exterior building covering elements. A preferred embodiment of this invention, for example, is an exterior building covering article having dimensions of 2' × 4' × 1 inch and having pigments, suitable filling for texture, and designs on the exterior veneer surface simulating a cedar shake. Said article comprises a laminate cementitious composite comprising an unfoamed cementitious veneer having a thickness of from 1/16 inch to ½ inch and a foamed cementitious material layer having a thickness of 7/8 inch to ½ inch.

The surface which serves as a casting mold may be of silicon rubber, wood, aluminum, or, in the case of the laminated cementitious composite, a cementitious material.

The following examples and tables are presented to illustrate but a few embodiments of the invention and are not to be construed as limiting in scope. All parts and percentages, the sum of which is 100, throughout the specification and claims are by weight unless otherwise indicated. Table I presents data which show the improvements of articles of this invention in properties such as lightness of weight, fire resistance, insulative characteristics, and durability. Table II presents data which show the improvements in weather performance, i.e. appearance, of an article of this invention.

EXAMPLE 1

A foamed cementitious material is prepared as follows: 37.0 parts acrylic emulsion polymer comprising a polymerized monomer mix of butyl acrylate (BA) / methyl methacrylate (MMA) / methacrylic acid (MAA) (48/50/2 parts respectively) (aqueous emulsion), including about 1.0 part surfactant, is foamed by high speed mechanical agitation means to produce an emulsion foam. To this foam is added 44.0 parts portland cement (Type I) and 17.0 parts sand with continuous high speed agitation so as to give a stable filled foam. This filled foam is then cast into a mold having a suitable surface and allowed to harden for about 12 hours. The resulting material is then removed from the mold and allowed to cure at ambient conditions for about 7 days.

EXAMPLE 2

A material is prepared as in Example 1 except that 2.2 parts of iron oxide pigment is further included with the cement and sand.

EXAMPLE 3

A material is prepared as in Example 2 except that 6.0 parts of glass fibers is further included with the cement, sand, and pigment.

EXAMPLE 4

A material essentially of the composition as in Example 1 is prepared by a process wherein 37.0 parts acrylic polymer emulsion comprising a polymerized monomer mix of BA/MMA/MAA (48/50/2) (aqueous emulsion) including about 1.0% surfactant, 44.0 parts portland cement (Type I) and 17.0 parts sand is blended by mechanical agitation means. To this blend is added powder and about 1.0% alkaline metal hydroxide base so as to effect chemical generation of hydrogen gas whereby the cementitious mixture is foamed. This filled foam is then cast into a mold having a suitable surface and allowed to harden for about 12 hours. The resulting material is then removed from the mold and allowed to cure at ambient conditions for about 7 days.

EXAMPLE 5

A material is prepared as in Example 4 except that 2.2 parts iron oxide pigment and 6.0 parts glass fibers is further included with the cement and sand.

EXAMPLE 6

37.0 parts styrene/butadiene polymer emulsion (aqueous) comprising a polymerized monomer mix of 50 parts styrene and 50 parts butadiene including about 1.0% surfactant is foamed by high speed mechanical agitation means to produce an emulsion foam. To this foam is added 44.0 parts portland cement and 17.0 parts sand with continuous high speed agitation so as to give a stable filled foam. This foam is then cast onto a mold having a suitable surface and allowed to harden for about 12 hours. The resulting material is then removed from the mold and allowed to cure at ambient conditions for about 7 days.

EXAMPLE 7

A material is prepared as in Example 6 except that 2 parts iron oxide pigment is included with the cement and sand.

EXAMPLE 8

A laminated cementitious composite is produced by preparing an unfoamed cementitious material wherein 65.4 parts of portland cement (Type I), 2.2 parts iron oxide pigment, 6.5 parts sand, 10.7 parts water, and 15.4 parts of the acrylic emulsion polymer described in Example 1 are blended. This material is cast onto a mold having a suitable surface. A foamed cementitious material, prepared as in Example 2, is then cast onto the surface of the unfoamed material. The resulting laminated composite is then allowed to harden for about 12 hours whereupon the unfoamed and foamed materials become fixed at their interface. The resulting laminated composite is then removed from the mold and allowed to cure at ambient conditions for approximately 7 days. Physical data describing this material is presented in Table I.

EXAMPLE 9

A laminated cementitious composite is produced as in Example 8 except that 6.0 glass fiber is further included with both the unfoamed and foamed materials.

EXAMPLE 10

A laminated cementitious composite is produced by preparing an unfoamed cementitious material wherein 65.4 parts of portland cement (Type I), 2.2 parts iorn oxide pigment, 6.5 parts sand, 10.7 parts water, and 15.4 parts of the styrene/butadiene emulsion polymer described in Example 6 are blended. This material is cast onto a mold having a suitable surface. A foamed cementitious material, prepared as in Example 7, is then cast onto the surface of the unfoamed material. The resulting laminated composite is then allowed to harden for about 12 hours whereupon the unfoamed and foamed materials become fixed at their interface. The resulting laminated composite is then removed from the mold and allowed to cure at ambient conditions for approximately 7 days.

EXAMPLE 11

A laminated cementitious composite is produced as in Example 10 except that 6.0 glass fiber is further included with both the unfoamed and foamed materials.

EXAMPLE 12A

The laminated cementitious composite is produced by preparing an unfoamed cementitious material wherein 64.5 parts portland cement (Type I), 1.8 parts Mapico Black pigment, 6.45 parts sand (white bar) and 15.2 parts of the acrylic polymer emulsion system described in Example 1, 10.50 parts water and 1.50 parts fiberglass (¼ inches milled) are blended. This material is cast onto a mold having a suitable surface. A foamed cementitious material is prepared by the method described in Example 1 wherein 34.83 parts acrylic polymer emulsion system of Example 1 including about 0.17 parts surfactant (commercial surfactant Triton X-100, a 25% aqueous preparation of alkyl ethoxylated phenol type agent) is foamed. To this foam is added 42.70 parts portland cement (gray, Type I), 17.08 parts sand (bar), 1.22 parts pigment (Mapico Black), and 3.83 parts fiberglass (¼ inch milled) with continuous high-speed agitation so as to give a stable filled foam. This filled foam is then cast onto the surface of the unfoamed material. The resulting laminated composite is then allowed to harden for about 12 hours whereupon the unfoamed and foamed materials become fixed at their interface. The resulting laminated composite is then removed from the mold and allowed to cure at ambient conditions for approximately 7 days.

Table II shows the presence of the acrylic polymer enhances weathering performance compared to a cementitious material which lacks the polymer.

EXAMPLE 12B

A laminated cementitious composite is produced as in Example 12A except that the acrylic emulsion polymer is deleted from the formulation of the unfoamed material and additional water is substituted in the place of the polymer system.

EXAMPLE 13

A laminated cementitious composite is produced by preparing a composite material of Example 8 wherein, in addition, a ¼ inch thick plywood sheet is applied to the exposed surface of the foamed material prior to allowing the material to harden. The resulting composite material is allowed to harden, removed, and cured as in Example 8.

EXAMPLE 14

A foamed cementitious material is prepared as in Example 1 except that the ratio of components, cement/sand/acrylic polymer emulsion system is 56.6/22.6/45.2. Physical data for this material is presented in Table 1.

EXAMPLE 15

A foamed cementitious material is prepared as in Example 1 except that sand is deleted from the formulation and ¼ inch thick fiberglass fibers is added to the formulation. The ratio of components is portland cement/acrylic emulsion polymer/fiberglass/ surfactant is 63.5/31.1/4.8/0.6. Physical data describing this material is presented in Table I.

EXAMPLE 16

A foamed cementitious material is prepared as in Example 4 with the following exceptions:
(a) sand is deleted from the composition; and
(b) the relative proportions of components is varied.

Accordingly, 54.79 parts portland cement (Medusa white, Type I), 0.27 parts aluminum powder, 1.1 part KOH solution (20% aqueous), 42.98 parts acrylic polymer emulsion, and 0.86 parts Triton X-100 (25% aqueous, surfactant). The characteristics of this material is presented in Table I.

EXAMPLE 17

For comparative purposes, Example 4 is repeated but excluding the acrylic emulsion polymer and substituting water in its place. The physical properties of this comparison material are presented in Table I.

TABLE I
PHYSICAL PROPERTIES OF CEMENTITIOUS ARTICLES

| Property (Test Method) | | Example 8 | Example 14 | Example 15 | Example 16 | Example 17 |
|---|---|---|---|---|---|---|
| Density, g/cc. | | 0.5 | 0.49 | 0.7 | 0.54 | 0.53 |
| Compressive Strength, pis. | (ASTM* 1621) | 762 | 189 | 312 | — | — |
| Compressive Stress, psi. | | — | — | — | 322 | 324 |
| Compressive Deformation, % | | — | 2.87 | 10 | 10 | 0.82 |
| Compressive Modulus, psi. | (ASTM 1621) | 32,190 | — | — | — | — |
| Flexural Strength, psi. | (ASTM D-790) | 1,189 | — | 300 | — | — |
| Flexural Stress, psi. | | — | 107.8 | — | 226 | 189 |
| Flexural Strain, in/in. | | — | 0.01 | — | 0.0082 | 0.0007 |
| Flexural Modules, psi. | (ASTM D-790) | 83,495 | — | 39,000 | 41,524 | 274,434 |
| Flexural Work | | — | 0.322 | — | 0.540 | 0.037 |
| Tensile Strength, psi. | (ASTM 1623) | 562 | 49.4 | 125 | — | — |
| Tensile Elongation, % | | — | 1.96 | 4.0 | — | — |
| Falling Ball Test | 3" drop | — | — | — | — | I*** |
| (ft./lbs.) | 6" drop | — | — | — | I | SB**** |
| | 9" drop | — | — | — | SB | — |
| Coefficient Thermal Expansion, in/in ° F × $10^5$ | (ASTM 696) | 1.413 | — | 1.41 | — | — |
| Thermal Conductivity K=BTU × $hr^{-1}$ × $ft.^{-2}$ × (° $in^{-1}$)hu−1 | (ASTM D-2214) | 1.449 | — | 1.44 | — | — |
| Oxygen Index | | — | — | 39.0 | — | — |
| Fire Response | (UL** 94) | 94 V-O | — | — | — | — |

***I = indentation
****SB = surface breaks
*ASTM = American Society for Testing Materials
**UL = Underwriters Laboratory

TABLE II
EFFECT OF ACRYLIC POLYMER ON WEATHERING PERFORMANCE TEST* OF VENEER OF CEMENTITIOUS COMPOSITE

| | Example 12-A | Example 12-B |
|---|---|---|
| Rating (500 Hours) | 3F** | 3F |
| Rating (1000 Hours) | 3F | 5F |

*Modified Xenon Weather-O-Meter Test
**F = unit measure of fade; 5F = maximum fade (whitening)

I claim:

1. A cementitious composite comprising (a) a veneer of unfoamed cementitious material comprising Portland cement and, on a weight basis per part of said cement, 0.001 to 2 parts film-forming and water-resistant, and alkali-stable emulsion polymer, 0.001 to 0.4 parts pigment, 0.025 to 2.4 parts sand, and 0.025 to 2 parts water on (b) a substrate of a foamed cementitious material comprising portland cement and about 0.001 to 2 parts by weight film-forming and water-resistant, and alkali-stable emulsion polymer per part by weight portland cement.

2. The composite of claim 1 wherein the foamed material further includes up to 2.4 parts by weight sand per part cement; up to 0.4 parts by weight pigment per part cement; and up to 0.8 parts fibrous reinforcement per part cement.

3. The material of claim 2 wherein the unfoamed material further includes 0.001 to 0.8 parts by weight fibrous reinforcement per part cement.

4. The composite of claim 1 further including a layer of plywood or metal applied at the exposed foamed cementitious material surface.

* * * * *